United States Patent Office 3,560,481
Patented Feb. 2, 1971

3,560,481
PHARMACEUTICALLY ACTIVE AZATRICYCLIC CARBOXAMIDES
Gilbert H. Berezin, West Chester, Pa., assignor to E. I. du Pont de Nemours and Company, Wilmington, Del., a corporation of Delaware
No Drawing. Filed Nov. 12, 1968, Ser. No. 775,114
Int. Cl. C07d 41/00
U.S. Cl. 260—239       2 Claims

ABSTRACT OF THE DISCLOSURE

This invention relates to the novel compounds 4-azatricyclo[4.3.1.1$^{3,8}$]undecane - 4 - carboxamide and 4-azatricyclo[4.3.1.1$^{3,9}$]dodecane - 4 - carboxamide, the methods of preparing same and novel intermediates formed in their preparation. These compounds are useful as antiviral agents.

SUMMARY OF THE INVENTION

This invention is directed to azatricyclic compounds which are useful in controlling virus growth.

In particular this invention is directed to compounds of the following formulae:

(I)

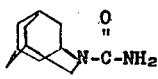

and (II)

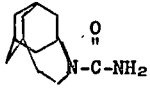

I have also discovered novel compounds which are useful as intermediates in the preparation of compounds of Formulae I and II. These compounds are represented by the following formulae:

(III)

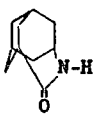

(IV)

and acid addition salts thereof.

(V)

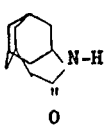

(VI)

and acid addition salts thereof.

DESCRIPTION OF THE INVENTION

This invention is based on the discovery that 4-azatricyclo[4.3.1.1$^{3,8}$]undecane - 4 - carboxamide and 4-azatricyclo[4.3.1.1$^{3,9}$]dodecane - 4 - carboxamide are useful as antiviral agents.

PREPARATION

The compounds of this invention can be prepared as set forth in the following examples.

Example 1.—Adamantanone oxime

To a solution of 90 g. (1.29 moles) of hydroxylamine hydrochloride and 145 g. (1.06 moles) of sodium acetate trihydrate in 450 ml. (0.60 mole) of water, there is added 90 g. of adamantanone in 50 ml. of ethanol. When the reaction mixture thickens, it is diluted with 200 ml. of water and stirred overnight. At the end of this period the solid is filtered and washed with water. Recrystallization of the solid from ether gives adamantanone oxime, M.P. 166–167° C.

The preparation of adamantanone oxime is also reported in G. W. Smith and H. D. Williams J. Org. Chem. 26, 2207 (1961).

Example 2.—4-azatricyclo[4.3.1.1$^{3,8}$]undecane-5-one

To a solution of 30 g. (0.18 mole) of adamantanone oxime in 360 ml. of a 20% solution sodium hydroxide in water, there is added 50 g. (0.28 mole) of benzenesulfonyl chloride with vigorous stirring at 20–30° C. The temperature is held at less than 30° C. with an ice bath until no further exothermic tendency is noted. The temperature of the reaction is raised to 55° C. and held at 55° C. for two hours with vigorous stirring. At the end of this period the solution is almost clear. The solution is cooled and extracted with three 600 ml. portions of chloroform. The chloroform solution is dried with anhydrous magnesium sulfate, filtered and evaporated at reduced pressure. The residual solid is recrystallized from hexane to give 4-azatricyclo[4.3.1.1$^{3,8}$]undecane - 5 - one. M.P. 309–310° C.

Analysis.—Calcd. for $C_{10}H_{15}NO$ (percent): C, 72.7; H, 9.15; N, 8.48. Found (percent): C, 72.9; H, 9.25; N, 8.43.

Example 3.—4-azatricyclo[4.3.1.1$^{3,8}$]undecane hydrochloride

To 12 g. (0.07 mole) of 4-azatricyclo[4.3.1.1$^{3,9}$]undecane-5-one dissolved in 400 ml. of tetrahydrofuran, there is added 8 g. (0.21 mole) of lithium aluminum hydride. The solution is stirred and heated at reflux for 18 hours in a nitrogen atmosphere and is then cooled to 0° C. A 20% sodium hydroxide solution is added cautiously until the salts precipitate. The tetrahydrofuran solution is decanted and the salts are washed with an additional 100 ml. of tetrahydrofuran. The combined tetrahydrofuran solution is dried with anhydrous magnesium sulfate, filtered and evaporated at reduced pressure. The residual oil is steam distilled into hexane. The hexane solution is dried with anhydrous magnesium sulfate and is then filtered. Anhydrous hydrogen chloride gas is passed into the hexane solution until precipitation of a white solid is complete. The white solid is filtered and recrystallized from ethanol to give 4-azatricyclo[4.3.1.1$^{3,9}$]undecane hydrochloride, M.P. 300° C.

Analysis.—Calcd. for $C_{10}H_{17}N \cdot HCl$ (percent): C, 64.2; H, 9.58; N, 7.46; Cl, 18.9. Found (percent): C, 64.6; H, 9.82; N, 7.5; Cl, 18.7.

Example 4.—4-azatricyclo[4.3.1.1$^{3,8}$]undecane-4-carboxamide

To 2 g. (0.011 mole) of 4-azatricyclo[4.3.1.1$^{3,8}$]undecane hydrochloride dissolved in 10 ml. of water, there is added 1 g. (0.012 mole) of potassium cyanate at 60° C. The solution is heated on a steam bath for thirty minutes and then allowed to cool. A white solid precipitates and is filtered. The solid is recrystallized from 100 ml. of water. The white needles are dried for 18 hours in a vacuum drying pistol containing $P_2O_5$ at 60° C. to give 4 - azatricyclo[4.3.1.1$^{3,9}$]undecane - 4 - carboxamide, M.P. 126–127° C.

Example 5.—Tricyclo[4.3.1.1$^{3,8}$]undecane-4-one oxime

To a solution of 30 g. (0.43 mole) of hydroxylamine hydrochloride and 48 g. (0.35 mole) of sodium acetate trihydrate in 150 ml. of water, there is added 30 g. of tricyclo[4.3.1.1$^{3,8}$]undecane-4-one in 50 ml. of ethanol. An additional 100 ml. of water is added and the mixture stirred at room temperature for an additional eighteen hours. The solid precipitate is filtered and washed with water. The solid is air dried and recrystallized from ether-pentane to give tricyclo[4.3.1.1$^{3,8}$]undecane-4-one oxime, M.P. 150–152° C.

Analysis.—Calcd. for $C_{11}H_{17}NO$ (percent): C, 73.8; H, 9.51; N, 7.85. Found (percent): C, 74.07; H, 9.56; N, 8.41.

Example 6.—4-azatricyclo[5.3.1.1$^{3,9}$]dodecane-5-one

To 240 ml. of 20% sodium hydroxide solution is added, with stirring, 22 g. (0.12 mole) of tricyclo[4.3.1.1$^{3,8}$]undecane-5-one oxime. To this well stirred solution is added 36 g. (0.20 mole) of benzenesulfonyl chloride. The reaction is controlled at 25–30° C. with an ice bath until the exothermic reaction subsides. The reaction mixture is then heated to 55° C. for one hour. At the end of the heating period the solution is almost clear. The reaction mixture is cooled and extracted with three 300 ml. portions of chloroform. The chloroform is filtered, dried over anhydrous magnesium sulfate and evaporated. The residual solid is recrystallized from heptane to give 4-azatricyclo[5.3.1.1$^{3,9}$]dodecane-5-one, M.P. 233–235° C. decomp.

Analysis.—Calcd. for $C_{11}H_{17}NO$ (percent): C, 73.8; H, 9.51; N, 7.85. Found (percent): C, 73.6; H, 9.67; N, 7.85.

Example 7.—4-azatricyclo[5.3.1.1$^{3,9}$]dodecane hydrochloride

To a suspension of 8 g. (0.21 mole) of lithium aluminum hydride in 300 ml. of tetrahydrofuran, there is added, at 25° C. in a nitrogen atmosphere, 12 g. (0.667 mole) of 4-azatricyclo[5.3.1.1$^{3,9}$]dodecane-5-one dissolved in 200 ml. tetrahydrofuran. The resulting mixture is stirred and heated at reflux in a nitrogen atmosphere for 48 hours. At the end of this period the mixture is cooled to 0° C. and 20% sodium hydroxide solution is added to precipitate the salts. The tetrahydrofuran solution is decanted and evaporated at reduced pressure. The residual oil is steam distilled into hexane. The hexane solution is dried with anhydrous magnesium sulfate and is then filtered. Anhydrous hydrogen chloride gas is passed into the hexane solution until precipitation of a white solid is complete. The solid is then recrystallized from ethanol ether to give 4-azatricyclo[5.3.1.1$^{3,9}$]dodecane amine hydrochloride, M.P. 300° C.

Analysis.—Calcd. for $C_{11}H_{19}N \cdot HCl$ (percent): C, 65.5; H, 9.95; N, 6.95; Cl, 17.6. Found (percent): C, 65.5; H, 10.09; N, 6.82; Cl, 17.3.

Example 8.—4-azatricyclo[5.3.1.1$^{3,9}$]dodecane-4-carboxamide

To 4 g. (0.02 mole) of 4-azatricyclo[5.3.1.1$^{3,9}$] dodecane hydrochloride dissolved in 10 ml. of water, there is added 1.5 g. (0.017 mole) of potassium cyanate at 60° C. The solution is heated on a steam bath for thirty minutes and then allowed to cool. A white solid precipitates and is filtered. The solid is recrystallized from 100 ml. of water and is then dried for 18 hours in a vacuum drying pistol containing $P_2O_5$ at 60° C. to give 4-azatricyclo[5.3.1.1$^{3,9}$]dodecane-4-carboxamide, M.P. 166–168° C.

The adamantane starting material employed in Example 7 above can be prepared as taught in U.S. Pat. No. 3,257,456.

The tricyclo[4.3.1.1$^{3,8}$]undecane-4-one starting material employed in Example 5 above can be prepared as described in the following examples.

Example 9

To a well stirred solution of 0.1 mole adamantanone dissolved in 75 ml. of methanol, there is added 0.30 mole of concentrated sulfuric acid at a rate that causes the solution to reflux. To this refluxing solution is added a saturated aqueous solution containing 0.60 mole of sodium cyanide. The resulting solution is heated at reflux for one hour. The solution is stirred for an additional three hours at room temperature. At the end of this period, 200 ml. of ether is added to the solution. The ether solution is decanted from the precipitated salts and extracted with two 50 ml. portions of saturated sodium chloride solution. The ether solution is dried with anhydrous magnesium sulfate. The solution is filtered and the ether is removed at reduced pressure to give a tan solid. The solid is recrystallized from methyl cyclohexane to give adamantane cyanohydrin, M.P. 257–259° C. (decomp.).

Example 10

To suspension of 0.13 mole lithium aluminum hydride in 200 ml. of ether, is added with vigorous stirring at reflux 0.028 mole of adamantanone cyanohydrin dissolved in 100 ml. of ether. The mixture is heated at reflux for 6 hours and then allowed to cool to room temperature. Stirring is continued overnight. At the end of this period, the mixture is cooled to —5° C. with an ice-acetone bath. To the cooled reaction mixture is added 30% aqueous sodium hydroxide until the salts precipitate. The ether solution is filtered and dried over potassium hydroxide pellets. The ether is filtered and evaporated at reduced pressure to give 2-aminomethyl-2-adamantanol as a white solid. The compound when recrystallized from cyclohexane gives white plates, M.P. 124–126° C.

Analysis.—Calcd. for $C_{11}H_{19}NO$ (percent): C, 74.6; H, 8.50; N, 7.90. Found (percent): C, 74.9; H, 8.47; N, 8.00.

The amine hydrochloride is prepared by dissolving 2-aminomethyl-2-adamantanol in a mixture of 50% tetrahydrofuran and 50% ether. Anhydrous hydrogen chloride gas is then introduced into this solution to precipitate the amine hydrochloride. The white precipitate is recrystallized for methanol-ether to give white plates, M.P. >300° C.

Analysis.—Calcd. for $C_{11}H_{19}NO \cdot HCl$ (percent): C, 60.7; H, 9.2; N, 6.4; Cl, 16.3. Found (percent): C, 61.2; H, 9.6; N, 6.5; Cl, 16.0.

Example 11

To a 1300 ml. stainless steel bomb, there is added 45 g. of spiro[oxirane-2,2'-tricyclo(3.3.1.1$^{3,7}$)]undecane, 800 ml. of 28% ammonium hydroxide solution and 60 g. of ammonia. The bomb is sealed and the reaction mixture is heated to 120° C. for three hours with shaking. The bomb is cooled and the contents decanted. The aqueous solution containing a tan solid is diluted to 2 liters with water and heated to reflux. The boiling solution is filtered, concentrated to 800 ml. and cooled to 0° C. in an ice bath. The glistening white plates that precipitate are filtered, pressed dry and recrystallized from cyclohexane to give 2-aminomethyl-2-adamantanol identical in all respects to that obtained from adamantanone cyanohydrin.

Example 12

To a well-stirred solution of 0.54 mole of 2-aminomethyl-2-adamantanol in 520 ml. of glacial acetic acid and 1040 ml. of water, there is added at 0° C. 1.24 moles of sodium nitrite dissolved in 174 ml. of water. The reaction mixture is stirred vigorously for 1 hour at 0° C. and allowed to come to room temperature with continued vigorous stirring. During this period, a white precipitate forms. The slurry is cooled to 0° C. and made basic (pH–9) by the addition of solid sodium hydroxide. The cold slurry is filtered and the collected solid sodium is washed with water until the washes are neutral. The solid is steam distilled into hexane to give tricyclo (4.3.1.1$^{3,8}$)undecane-4-one, M.P. 258–260° C. (sealed tube). Molecular weight, Calcd. 164.1201. Found 164.1206 (by mass spec.).

$CH_2Cl_2$ max 3050, 1700, 1455, 1357, 1175, 1080 cm.$^{-1}$

*Analysis.*—Calcd. for $C_{11}H_{16}O$ (percent): C, 80.6; H, 9.7. Found (percent): C, 80.9; H, 9.7.

APPLICATION

As stated above, the compounds of Example 4 and Example 8 are useful as antiviral agents in warm-blooded animals. Tests indicate that these compounds are effective in controlling group A (mosquito borne) arbovirus infections.

Arboviruses are the causative agents in diseases such as Eastern and Western Equine Encephalities and Venezuelan Equine Encephalitis.

The antiviral effectiveness of 4-azatricyclo[4.3.1.1$^{3,8}$]undecane-4-carboxamide and 4-azatricyclo[5.3.1.1$^{3,9}$]dodecane-4-carboxamide is demonstrated by the test reported below.

Monolayers of chickembryo cells were infected with Semliki Forest Virus and overlayed with ayor maintainance medium. Poper discs (8 mm. in diameter) were treated with graded amounts of test compound, then placed on the ayor surface and the plates incubated for 42 hours. Plates were then stained and examined for an area free of virus-caused plaques surrounding the medicated discs. Any zone free of plaques is considered activity at that compound level. The results of the test described above is reported in the following table.

TABLE

| Mcg. compound per patch | 4-azatricyclo-[4.3.1.1$^{3,8}$]-undecane-4-carboxamide | | 4-azatricyclo-[5.3.1.1$^{3,9}$]-dodecane-4-carboxamide | |
|---|---|---|---|---|
| | Toxicity | Activity | Toxicity | Activity |
| 80 | − | + | + | + |
| 40 | − | + | − | + |
| 20 | − | + | − | ± |
| 10 | − | + | − | ± |
| 5 | − | + | − | − |
| 2.5 | − | + | − | − |
| 1.25 | − | − | − | − |
| 0 | − | − | − | − |

NOTE.—The above symbols are to be interpreted as follows:
− = No cell toxicity or activity.
± = Slight cell toxicity or slight activity (reduction in plaque size around disc).
+ = Toxicity or activity (zone free of plaques around disc).

The antiviral active compounds of Formula I and Formula II can be employed in useful compositions according to the present invention in dosage forms such as tablets, capsules, powder packets or liquid solutions, suspensions or elixirs, for oral administration, or liquid solutions for parenteral use, and in certain cases suspensions for parenteral, but not intravenous, use. In such compositions the active ingredient will ordinarily always be present in an amount of from about 0.1% to about 95% by weight based on the total weight of the composition. Besides the active ingredient of Formula I the antiviral composition will contain a solid or liquid nontoxic pharmaceutical carrier for the active ingredient.

In one embodiment of a pharmaceutical composition of this invention, the solid carrier is a capsule which can be of the ordinary gelatin type. In the capsule will be from about 30 to 60% by weight of an antiviral active compound of this invention and 70 to 40% of a carrier.

The pharmaceutical carrier can, as previously indicated, be a sterile liquid such as water and oils, including those of petroleum, animal, vegetable or synthetic origin, for example peanut oil, soybean oil, mineral oil and sesame oil. In general, water, saline, aqueous dextrose and related sugar solutions and glycols such as propylene glycol or polyethyleneglycols are preferred liquid carriers, particularly for injectible solutions. Sterile injectible solutions such as saline will ordinarily contain from about 0.1 to 10% and preferably 0.5 to 5% by weight of the active ingredient.

As stated above the compounds of this invention are antiviral agents in warm-blooded animals. In one embodiment they can be employed to protect domestic animals and livestock from Group A arboviruses by incorporating an active ingredient in the diet of the animal. For most purposes, an amount of active compound will be used to provide from about 0.0001% to 0.1% or higher and preferably from 0.001% to 0.2% by weight of the active compound based on the total weight of feed intake.

Thus, useful compositions are provided by this invention which comprise an antiviral active compound of this invention in admixture with an animal feed. Description of suitablefeeds can be found in the book "Feeds and Feeding" by Frank B. Morrison, published by the Morrison Publishing Company of Ithaca, N.Y., 1948, 21st edition. The selection of the particular feed is within the knowledge of the art and will depend, of course, on the animal, the economics, natural materials, the circumstances and the nature of the effect desired, as will be readily understood.

In another embodiment the antiviral active compound is formulated as a feed concentrate, suitable for preparation and sale to a farmer, livestock grower or horse breeder for addition to the animal's feedstuffs in appropriate proportion. The concentrates ordinarily comprise about .5% to about 95% by weight of the active compound together with a finely divided solid, preferably flours, such as wheat, corn, soyabean and cottonseed. Depending on the recipient animal, the solid adjuvant can be ground cereal, charcoal, fotter's earth, oyster shell and the like. Finely divided attapulgite and bentonite can be used. The latter materials also acting as solid dispersing agents.

The feed compositions, as well as the just described concentrates, can additionally contain either components of feed concentrates or animal feeds, as will be readily understood. Other particularly important additives include proteins, carbohydrates, fats, vitamins, minerals, antibiotics and other supplements normally employed in feed compositions and feed concentrates.

I claim:
1. A compound of the formula:

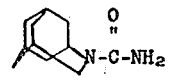

2. A compound of the formula:

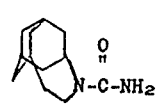

References Cited

UNITED STATES PATENTS 3,374,244  3/1968  Krimmel _____ 260—326.3

ALEX MAZEL, Primary Examiner

R. V. RUSH, Assistant Examiner

U.S. Cl. X.R.

260—239.3; 424—244